US007480064B2

(12) United States Patent
Katano

(10) Patent No.: US 7,480,064 B2
(45) Date of Patent: Jan. 20, 2009

(54) METHOD AND SYSTEM FOR PROVIDING UPDATED HELP AND SOLUTION INFORMATION AT A PRINTING DEVICE

(75) Inventor: Seiichi Katano, San Jose, CA (US)

(73) Assignee: Ricoh Company, Tokyo (JP)

( * ) Notice: Subject to any disclaimer, the term of this patent is extended or adjusted under 35 U.S.C. 154(b) by 1102 days.

(21) Appl. No.: 10/404,755

(22) Filed: Mar. 31, 2003

(65) Prior Publication Data
US 2004/0201867 A1 Oct. 14, 2004

(51) Int. Cl.
*G06F 15/00* (2006.01)
*G09B 3/00* (2006.01)
(52) U.S. Cl. ...................... 358/1.15; 434/349
(58) Field of Classification Search ............... 358/1.15, 358/1.13, 1.14, 1.16, 404; 700/8, 51, 275; 709/221, 223; 434/118, 349–350, 323; 714/25
See application file for complete search history.

(56) References Cited

U.S. PATENT DOCUMENTS

2003/0110412 A1* 6/2003 Neville .................. 714/25
2004/0012808 A1* 1/2004 Payne et al. ............ 358/1.15

* cited by examiner

*Primary Examiner*—Saeid Ebrahimi Dehkordy
(74) *Attorney, Agent, or Firm*—Hickman Palermo Truong & Becker LLP; Christian A. Nicholes

(57) ABSTRACT

A method and system for providing updated help and solution information at a printing device is disclosed. According to one aspect, a printing device is configured to detect a problem relative to the printing device, to download solution data from a remote server, and display recommended actions to address the problem. According to another aspect, a printing device is configured to receive user input through a user interface on the printing device, and to print instructions for operating the printing device in response to the user input. According to another aspect, a printing device is configured to collect statistics that indicate how many times one or more particular help instructions or particular recommended actions have been selected or displayed. The printing device is further configured to provide the statistics to a remote server.

24 Claims, 10 Drawing Sheets

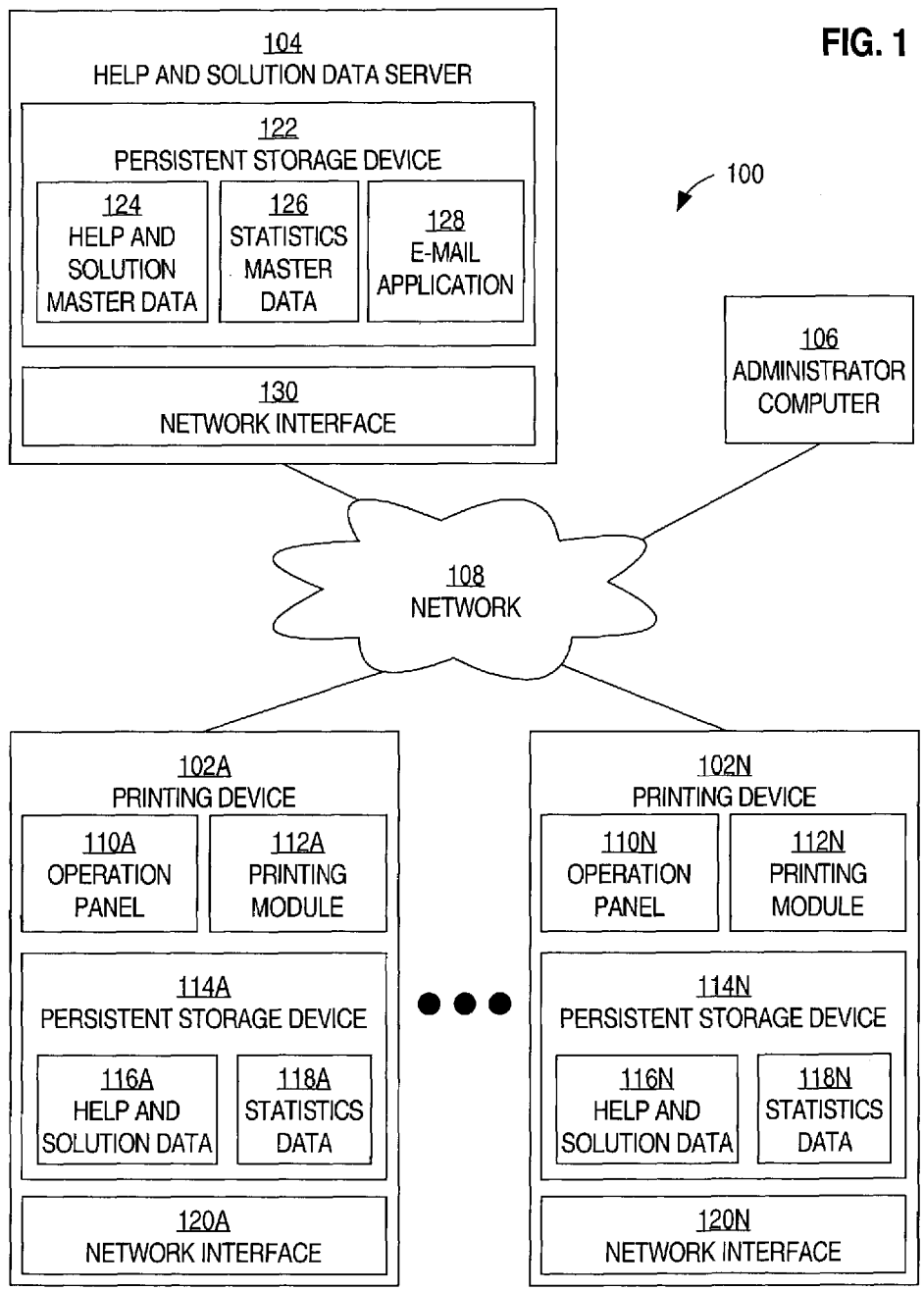

METHOD AND SYSTEM FOR PROVIDING UPDATED HELP AND SOLUTION INFORMATION AT A PRINTING DEVICE

FIELD OF THE INVENTION

The invention relates to printing devices, and more specifically, to a method and system for providing updated help and solution information at a printing device.

BACKGROUND OF THE INVENTION

Printing devices, such as printers, copy machines, and multi-function peripherals (MFPs) such as the Ricoh Aficio Color 6513 system, continue to become more sophisticated. Despite efforts to make printing devices easy to operate, many users of unfamiliar printing devices have, in the past, become perplexed when attempting to use those printing devices. To assist users, a maker of a printing device usually provides a paper copy of a user manual that contains instructions for operating a printing device. As long as a user manual remains in a known location close to the printing device, users can find help in the manual's pages.

Unfortunately, user manuals are often lost or misplaced. Frequently, user manuals are kept in a different location than the printing device for which they contain operating instructions. Even if a user knows where to find a user manual for the printing device that he is trying to operate, the user may be burdened with the task of traveling some distance to where the user manual is kept, and then traveling back to the printing device once he has read the user manual. This wastes the user's time.

Even easily operated printing devices can experience problems that require user intervention. The paper that feeds through a printing device may jam, requiring a user to remove one or more pages that are stuck someplace inside of the printing device. The printing device may run low on toner, requiring a user to supply additional toner to the printing device. The printing device may use all of the paper in its paper tray, requiring a user to insert more paper into the appropriate tray.

Some of the more sophisticated printing devices include a display that shows solution information for solving problems that the printing device may experience. For example, a printing device may display, on a liquid crystal display (LCD) panel located on the surface of the printing device, recommended actions for removing paper that is stuck within the printing device. In some instances, the recommend actions depict components of the printing device that the user must manipulate in order to remedy the problem. For example, a printing device may display, on an LCD panel, an image of the printing device with a particular door or cover opened, thus showing the user that he must open that particular door or cover to access the area of the printing device in which the problem has occurred. Such solution information is usually stored in firmware of the printing device.

While solutions presented on a printing device's display and operating instructions printed in a manual may assist a user, such solutions and instructions are sometimes difficult to understand. Instructions may be unclear, imprecise, incomplete, outdated, or even erroneous. When a user cannot understand help or solution information, the user may become frustrated with the printing device and the organization that made the printing device. Unfortunately, such organizations often remain oblivious to the plight of the user who cannot operate a printing device due to insufficient guidance. A maker of a printing device is unlikely to remedy confusion of which the maker is unaware.

Even when a printing device maker is aware of user confusion, distributing new printed manuals and/or dispatching service personnel to update solution information stored in firmware can be prohibitively expensive. Furthermore, users typically dislike waiting for new manuals or service personnel to arrive while printing devices sit idle.

Based on the need to provide better guidance to confused and frustrated users of printing devices, a method and system for providing updated help and solution information at a printing device is highly desirable.

SUMMARY OF THE INVENTION

A method and system for providing updated help and solution information at a printing device is disclosed. According to one aspect, a printing device is configured to detect a problem relative to the printing device, to download solution data from a remote server, and display recommended actions to address the problem. According to another aspect, a printing device is configured to receive user input through a user interface on the printing device, and to print instructions for operating the printing device in response to the user input. According to another aspect, a printing device is configured to collect statistics that indicate how many times one or more particular help instructions or particular recommended actions have been selected or displayed. The printing device is further configured to provide the statistics to a remote server.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1 is a block diagram that depicts a system for providing updated help and solution information at printing devices, according to one embodiment of the invention;

DETAILED DESCRIPTION OF THE INVENTION

Figure 2A:
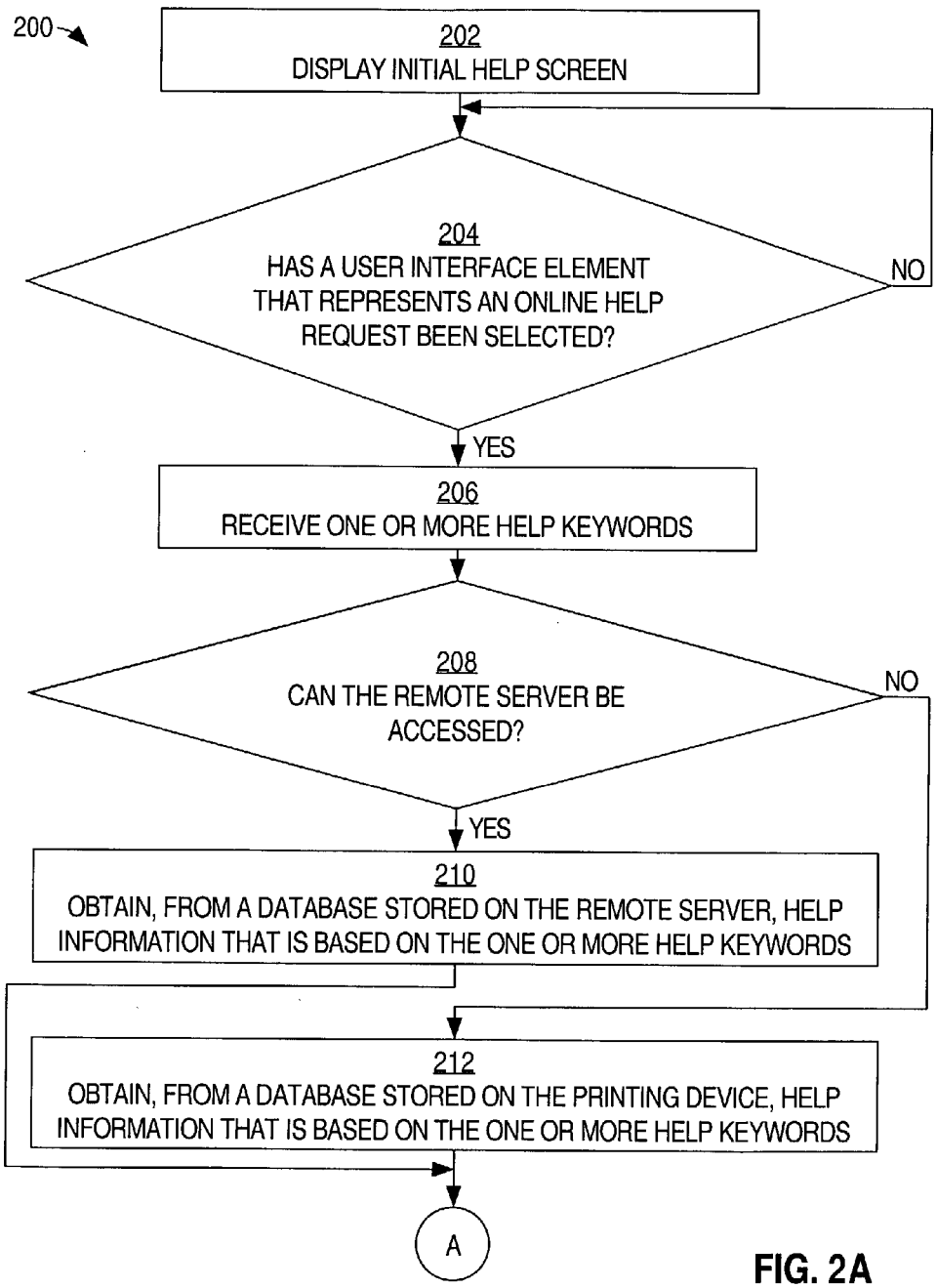
FIGS. 2A and 2B are flow diagrams that depict a process for providing help information at a printing device, according to one embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Example System for Providing Updated Help and Solution Information at Printing Devices FIG. 1 is a block diagram that depicts a system 100 for providing updated help and solution information at printing devices, according to one embodiment of the invention. System 100 comprises printing devices 102A-102N, help and solution data server 104, administrator computer 106, and network 108. While, in one embodiment of the invention, printing devices 102A-102N are communicatively coupled to network 108, and help and solution data server 104 is communicatively coupled to network 108, in an alternative embodiment of the invention, printing devices 102A-102N are directly connected to help and solution data server 104 without any intervening network.

Printing devices 102A-102N may be printers, MFPs, copy machines, fax machines, or other devices that can print on sheets of media such as paper or transparencies. According to one embodiment of the invention, among printing devices 102A-102N are different sub-types of printing devices. For example, in one embodiment of the invention, printing device 102A is a printer, printing device 102B is an MFP, printing device 102C is a copy machine, and printing device 102D is a fax machine.

Each of printing devices 102A-102N contains or is connected to multiple components. For example, printing device 102A has an operation panel 110A, a printing module 112A, a persistent storage device 114A, and, in one embodiment of the invention, a network interface 120A.

Network interface 120A allows printing device 102A to communicate with other devices, such as help and solution data server 104, through network 108. For example, network interface 120A may transmit and receive data packets according to data link layer, network layer, and transport layer protocols, such as Ethernet, Internet Protocol (IP), and Transmission Control Protocol (TCP). Thus, in one embodiment of the invention, network interface 120A is an Ethernet adapter. In an alternative embodiment of the invention, printing device 102A includes a communication interface, such as a Universal Serial Bus (USB) port, a parallel port, or a small computer system interface (SCSI) port, through which printing device 102A may be directly connected with other devices, such as help and solution data server 104.

According to one embodiment of the invention, persistent storage device 114A is a hard disk drive. In alternative embodiments of the invention, persistent storage device 114A comprises other forms of re-writable magnetic, optical, or electronic storage media. Persistent storage device 114A stores help and solution data 116A and statistics data 118A. In one embodiment of the invention, help and solution data 116A and statistics data 118A are stored in a database that is maintained on persistent storage device 114A.

Help and solution data 116A contains both help data and solution data. According to one embodiment of the invention, help data comprises information that is taken from a user manual, such as instructions for operating printing device 102A. Help data may be stored in database records indexed by one or more keywords to allow rapid search and retrieval. For example, a record that is indexed according to keywords "bypass tray" may contain information about the purpose, function, and use of a bypass tray of printing device 102A. A given record may include text and images.

According to one embodiment of the invention, solution data comprises one or more separate solutions. Each solution corresponds to, or is associated with, one or more problems. A particular solution may comprise one or more distinct recommended actions that a user is to take relative to printing device 102A to remedy a problem with which the particular solution is associated. For example, a solution that is associated with a paper jam in the vicinity of a roller may comprise recommended actions such as opening a top panel of the printing device and operating a particular lever to expose the roller to the user so that the user can remove the jammed paper. A sequence of recommended actions that are customized to solve a particular problem is sometimes called a "trouble recovery wizard."

Statistics data 118A comprises statistics pertaining to the access of help and solution data 116A. For example, statistics data 118A may comprise information about the number of times that users of printing device 102A have accessed a particular help data record or solution. This information can be used to identify parts of help and solution data 116A that might benefit from revision, and to improve future printing devices. According to one embodiment of the invention, when a user accesses help and solution data 116A, printing device 102A updates statistics data 118A, in response, to reflect the number of times that particular data has been accessed. For example, if a user accesses a record for "bypass tray" in help and solution data 116A, then printing device 102A updates statistics data 118A to reflect that access.

Printing module 112A comprises mechanical and electronic components that operate to print information, such as text and images, on sheets of media, such as paper or transparencies. Printing module 112A further comprises components that operate to feed sheets of media into the printing module from one or more selected input trays, and to output these sheets into one or more selected output bins.

According to one embodiment of the invention, operation panel 110A is located on the surface of printing device 102A to serve as a user interface—to receive input from a user and to display information to a user. Operation panel 110A comprises an input device, such as a touch panel or keypad, and a display device, such as an LCD, cathode ray tube (CRT), or plasma display. The input device and display device may be integrated. For example, in one embodiment of the invention, operation panel 110A comprises an interactive touch-sensitive screen that is capable of indicating to a user separate regions of a graphical user interface represented on the screen. These regions, when touched by the user, cause printing device 102A to perform different functions. Such regions are referred to as "user interface elements" or "user interface objects."

Printing device 102A may comprise components in addition to those described above. For example, printing device 102A may include a scanning module that operates to read images from a surface and produce data based on those images. Printing device 102A may contain one or more sensors that operate to detect when a problem has occurred relative to the printing device. Others of printing devices 102A-102N also comprise the components described above with reference to printing device 102A. Where printing device 102A is described below, the description may be applied to any of printing devices 102A-102N.

Network 108 may be implemented by any medium or mechanism that provides for the exchange of data between printing devices 102A-102N and help and solution data server 104. Examples of network 108 include, without limitation, a network such as a Local Area Network (LAN), Wide Area Network (WAN), Ethernet or the Internet, or one or more terrestrial, satellite or wireless links. Network 108 may include a combination of networks such as those described. Network 108 may transmit data according to Transmission Control Protocol (TCP) and Internet Protocol (IP).

Help and solution data server 104 may be implemented on a computer. Help and solution data server 104 comprises a persistent storage device 122 and a network interface 130. Persistent storage device 122 and network interface 130 are similar to persistent storage device 114A and network interface 120A, respectively, described above. Persistent storage device 122 stores help and solution master data 124, statistics master data 126, and an e-mail application 128. According to one embodiment of the invention, help and solution master data 124 and statistics master data 126 are stored in a database that is maintained on persistent storage device 122.

Help and solution master data 126 is similar in content to help and solution data 116 described above. Help and solution master data 126 may comprise help and solution data for each of printing devices 102A-102N. The help and solution data for one printing device may differ from the help and solution data for another printing device. For example, the operating instructions for a fax machine are typically different than operating instructions for a copy machine. According to one embodiment of the invention, help and solution master data is a most recently updated version of the help and solution information for each of printing devices 102A-102N.

Statistics master data 126 comprises statistical information about the usage of the help and solution data on each of printing devices 102A-102N. Thus, statistics master data 126 comprises a compilation of statistics data 118A-118N. For example, statistics master data 126 may contain information about how many times records for "bypass tray" have been accessed in any of help and solution data 116A-116N.

E-mail application 128 is an e-mail client application. E-mail application 128 is configured to send e-mail messages through network 108 to one or more specified e-mail accounts. Administrator computer 106 is configured to access such an e-mail account, for example, through network 108, to obtain such e-mail messages. E-mail messages may be temporarily stored on one or more e-mail servers.

A Printing Device that Downloads Solution Data from a Remote Server

According to one embodiment of the invention, printing device 102A detects a problem relative to the printing device. For example, printing device 102A automatically detects, through sensors, a paper jam in printing module 112A. Printing device 102A downloads, in response to detecting the problem, solution data from a specified remote server that stores the solution data. For example, printing device 102A downloads solution data from help and solution data server 104, which stores solution data in help and solution master data 124. Printing device 102A displays, through a user interface on the printing device, one or more recommended actions that are based on the solution data and which address the detected problem. For example, printing device 102A displays one or more recommended actions through operation panel 110A. Printing device 102A may select the one or more recommended actions from among a plurality of recommended actions, based on the detected problem. In this manner, printing device 102A may display one or more recommended actions that are specifically designed to solve a particular problem.

While, in one embodiment of the invention, printing device 102A downloads all of the solution data that pertains to printing device 102A in response to detecting a problem, in an alternative embodiment of the invention, printing device 102A downloads only the solution data that corresponds to a particular problem in response to detecting the particular problem.

By downloading solution data from a remote server that stores the solution data, printing device 102A can obtain updated solution data. Thus, a maker of printing device 102 can update the solution data that will be displayed to users of the printing device by updating the master solution data that is stored on help and solution data server 104. By downloading the solution data in response to detecting a problem, printing device 102A can display solution data that has been updated as of the time that the problem occurred. Others of printing devices 102A-102N may be configured similarly to printing device 102A. Therefore, updating help and solution master data 124 causes the solution data displayed by each such printing device to be updated, thereby eliminating any need to update such printing devices separately and individually.

Sometimes, communication between a printing device and a remote server is interrupted. For example, a portion of network 108 may fail, thereby preventing printing device 102A from communicating with help and solution data server 104 through network 108; at least temporarily. Therefore, according to one embodiment of the invention, printing device 102A determines, in response to detecting the problem, whether the printing device can currently access, through a communication interface of the printing device, the specified remote server that stores the solution data. For example, printing device 102A determines whether it can access help and solution data server 104 through network interface 120A and network 108. Printing device 102A may determine whether an active network connection is present, and whether help and solution data server 104 responds to queries made through the network connection. For example, help and solution data server 104 may be configured with a particular IP address, and printing device 102A may ping the particular IP address to determine whether the help and solution data server is currently accessible.

According to one embodiment of the invention, printing device 102A displays, in response to determining that the printing device cannot currently access the specified remote server that stores the solution data, one or more recommended actions that are based on solution data that the printing device previously downloaded from the remote server. For example, in response to determining that printing device 102A cannot currently access help and solution data server 104, the printing device displays recommended actions that are based on help and solution data 116A that is stored on persistent storage device 114A. According to one embodiment, help and solution data 116A contains solution data that printing device 102A most recently downloaded from help and solution data server 104. Thus, even when printing device 102A cannot connect to help and solution data server 104, printing device 102A can still display recommended actions to address detected problems.

According to one embodiment of the invention, printing device 102A also periodically downloads solution data from the specified remote server that stores the solution data, thus synchronizing help and solution data 116A with help and solution master data 124. For example, printing device 102A downloads solution data from help and solution data server 104A at one or more specified intervals of time, such as every day. According to one embodiment of the invention, printing device 102A stores the downloaded solution data on persistent storage device 114A. Consequently, help and solution data 116A may contain recently updated solution data even before a problem is detected. Thus, even if printing device 102A cannot access help and solution data server 104A at the time that the printing device detects a problem, the solution data stored on persistent storage device 114A may be relatively current.

A Printing Device that Prints Operating Instructions in Response to Receiving User Input Through a User Interface on the Printing Device As mentioned above, printed copies of user manuals are sometimes lost or misplaced. Even if the user manual is stored as a document on a persistent storage device of some computer, finding the location of the document within a hierarchical file structure can be time-consuming, and the document may be outdated. Users typically dislike having to leave a printing device to find a user manual or other help information.

Therefore, according to one embodiment of the invention, printing device 102A receives user input through a user interface on the printing device. For example, printing device 102A receives user input through operation panel 110A. The user input indicates to printing device 102A that operating instructions, such as a user manual for the printing device, should be printed. According to one embodiment of the invention, the user input consists of the touching of a single user interface element displayed on operation panel 110A, such as an interface element that depicts the label "print latest manual."

In response to receiving the user input through the user interface on the printing device, printing device 102A prints one or more instructions for operating the printing device. For example, printing device 102A prints help data, which is stored on persistent storage device 114A as a part of help and solution data 116, through printing module 112A. As a result, users do not need to leave printing device 102A to obtain operating instructions for the printing device. Users do not need to consult the website of an organization that supports the printing device, nor do users need to converse with a technical support agent of such an organization, to obtain assistance in operating printing device 102A.

While, in one embodiment of the invention, printing device 102A prints an entire user manual in response to receiving the user input, in an alternative embodiment of the invention, printing device 102A prints only a specified section of help data. A user may select such a section, from among a plurality of sections, through operation panel 110A. The selection may be made from a list of sections, or as a result of a search for one or more keywords.

User manuals for printing devices are sometimes revised to clarify, complete, or correct operating instructions contained therein. Even if a user can find a copy of a user manual, that copy might contain outdated information. Therefore, according to one embodiment of the invention, printing device 102A determines whether the printing device can currently access a specified remote server that stores the operating instructions described above. Printing device 102A may make the determination in response to receiving the user input described above. For example, printing device 102A determines whether it can currently access help and solution data server 104 through network interface 120A and network 108. Printing device 102A may ping an IP address of help and solution data server 104 to determine whether the printing device can access the help and solution data server.

According to one embodiment of the invention, in response to determining that printing device 102A can currently access the specified remote server, the printing device downloads one or more of the operating instructions from the specified remote server. For example, printing device 102A may download help data, such as a user manual or a section thereof, from help and solution data server 104, and store that help data on persistent storage device 114A.

While, in one embodiment of the invention, printing device 102A downloads an entire user manual in response to receiving the user input, in an alternative embodiment of the invention, printing device 102A downloads only a specified section of help data. A user may select such a section, from among a plurality of sections, through operation panel 110A.

According to one embodiment of the invention, if printing device 102A determines that the printing device cannot currently access help and solution data server 104, then printing device 102A prints one or more instructions that the printing device previously downloaded from the remote server. For example, if printing device 102A cannot access help and solution data server 104 at the time that the user input is received, then printing device may print a version of the help data that is stored on persistent storage device 114A. Thus, a user may obtain help information, such as a user manual, even if printing device 102A is not currently connected to network 108.

According to one embodiment of the invention, printing device 102A also periodically downloads help data from a specified remote server that stores the help data, in the same manner as that described above with reference to downloading solution data. Thus, relatively current help data may be provided to a user even if printing device 102A cannot access help and solution data server 104A at the time that the printing device receives user input that requests the help data.

A Printing Device that Maintains Statistical Data about Help and Solution Data Accesses Typically, if help or solution data is unclear or erroneous, users will access that help or solution data many times in an effort to understand what the help or solution data means. If a particular function of a printing device is difficult to understand or operate, or if a particular component of a printing device frequently malfunctions, then users will probably access help or solution data pertaining to that particular function or component many times. In accordance with one embodiment of the invention, an organization that makes or supports printing device 102A can obtain, from the printing device, information that may be used to determine which sections of help and solution data should be revised, and which aspects of the printing device should be redesigned or otherwise improved.

According to one embodiment of the invention, printing device 102A receives input through a user interface on the printing device. For example, printing device 102A receives user input through operation panel 110A. User input may comprise one or more keywords or the selection of one or more particular user interface elements. Based on the user input, printing device 102A selects, from among a plurality of help instructions that specify how to operate the printing device, one or more particular help instructions that correspond to the user input. For example, if help and solution data 116 is stored in a database, then printing device 102A selects one or more particular database records based on the user input.

Printing device 102A displays, through the user interface, the one or more particular help instructions. For example, printing device 102A displays the one or more particular help instructions through operation panel 110A. The help instructions may be displayed simultaneously, or in succession.

According to one embodiment of the invention, printing device 102A updates statistics that indicate how many times the one or more particular help instructions have been selected. For example, printing device 102A updates statistics data 118A. Printing device 102A may increment counters that are associated with each of the particular help instructions. According to one embodiment of the invention, printing device 102A informs help and solution data server 104 of the update to statistics data 118A, so that help and solution data server 104 may update statistics master data 126 to reflect the update to statistics data 118A.

According to one embodiment of the invention, printing device 102A determines whether a number of times that the one or more particular help instructions have been selected exceeds a specified threshold. For example, printing device 102A determines from statistics data 118A whether the particular help instructions have been accessed more than a specified number of times. In response to determining that the number of times that the one or more particular help instructions have been selected exceeds the specified threshold, printing device 102A generates a notification that indicates that the number of times that the one or more particular instructions have been selected exceeds the specified threshold.

According to one embodiment of the invention, printing device 102A updates statistics relating to recommended actions that are displayed in response to problems that the printing device detects. Printing device 102A updates statistics that indicate how many times one or more recommended actions have been displayed. Printing device 102A determines whether a number of times that the one or more recommended actions have been displayed exceeds a specified threshold. In response to determining that the number of times that the one or more recommended actions have been displayed exceeds the specified threshold, printing device 102A generates a notification that indicates that the number of times that the one or more recommended actions have been displayed exceeds the specified threshold.

A notification may be included in an e-mail message that is to be sent to a specified e-mail address. Additionally or alternatively, a notification may be written to a log stored on persistent storage device 114A. According to one embodiment of the invention, printing device 102A sends notifications, such as those described above, to a specified e-mail address. For example, printer 102A may send e-mail messages through network 108 to one or more specified e-mail accounts. Administrator computer 106 may access such an e-mail account through network 108 to obtain such e-mail messages. While, in one embodiment of the invention, printers 102A-102N are each configured to generate and send such notifications based on statistics data 118A-118N, respectively, in an alternative embodiment of the invention, help and solution data server 104 generates and sends such notifications based on statistics master data 126.

Example Process for Providing Help Information at a Printing Device

Figure 2B:
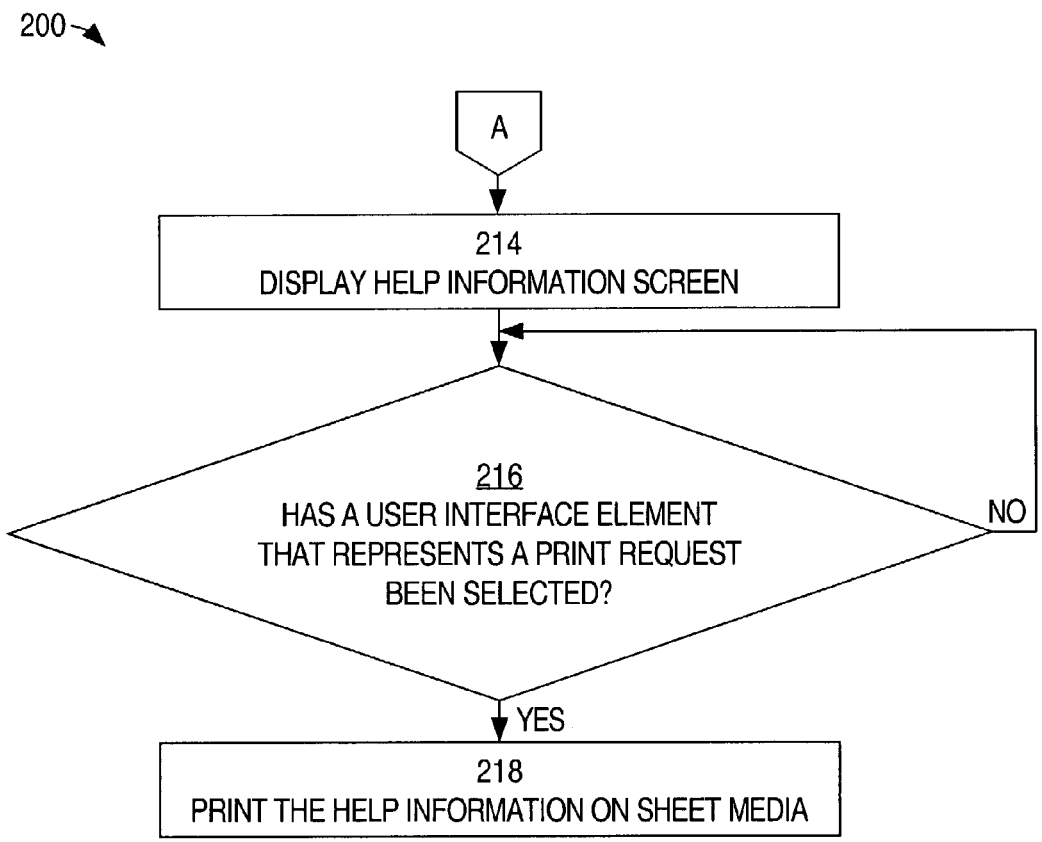

FIGS. 2A and 2B are flow diagrams that depict a process 200 for providing help information at a printing device, according to one embodiment of the invention. For example, any of printing devices 102A-102N may perform process 200.

In block 202, an initial help screen is displayed. For example, printing device 102A may display an initial help screen through operation panel 110A. The initial help screen may comprise selectable user interface elements with labels such as "print latest manual" and "online help."

In block 204, it is determined whether a user interface element that represents an online help request has been selected. For example, printing device 102A may determine whether a user interface element labeled "online help" has been selected through operation panel 110A. If it is determined that such a user interface element has not been selected, then control passes back to block 204. If it is determined that such a user interface element has been selected, then control passes to block 206.

In block 206, one or more help keywords are received. For example, printing device 102A may receive a help keyword via a keypad that is displayed through operation panel 110A. According to one embodiment of the invention, the one or more help keywords are received upon the selection of a user interface object that is labeled "go."

In block 208, it is determined whether a remote server can be accessed. For example, printing device 102A may determine whether it can currently access, through network interface 120A and network 108, help and solution data server 104. If the remote server can be accessed, then control passes to block 210. If the remote server cannot be accessed, then control passes to block 212.

In block 210, help information, based on the one or more help keywords, is obtained from a database stored on the remote server. For example, printing device 102A may obtain help information by downloading help data that is stored in help and solution master data 124. According to one embodiment of the invention, printing device 102A searches a database for help information that matches or contains particular keywords.

In block 212, help information, based on the one or more help keywords, is obtained from a database stored on the printing device. For example, printing device 102A may obtain help information that is stored in help and solution data 116.

In block 214, a help information screen is displayed. For example, printing device 102A may display the help information through operation panel 110A. Along with the help information, the help information screen may comprise selectable user interface objects with labels such as "print" and "exit."

In block 216, it is determined whether a user interface element that represents a print request has been selected. For example, printing device 102A may determine whether a user interface element labeled "print" has been selected through operation panel 110A. If such a user interface element has not been selected, then control passes back to block 216. If such a user interface element has been selected, then control passes to block 218.

In block 218, the help information is printed on sheet media. For example, printing device 102A may print the help information on one or more sheets of paper through printing module 112A. Prior to printing, the help information may be formatted according to a specified format.

Figure 3:
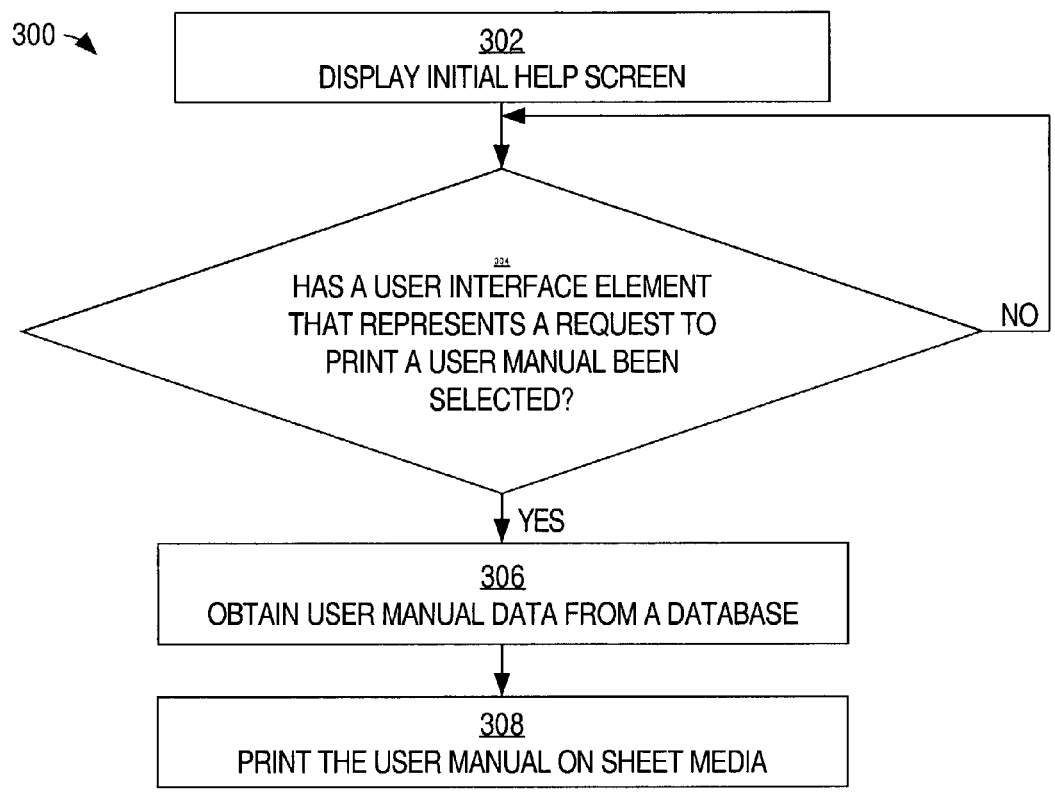
FIG. 3 is a flow diagram that depicts a process for printing an updated user manual at a printing device in response to user input received at the printing device, according to one embodiment of the invention.

Example Process for Printing a User Manual at a Printing Device in Response to User Input Received at the Printing Device FIG. 3 is a flow diagram that depicts a process 300 for printing an updated user manual at a printing device in response to user input received at the printing device, according to one embodiment of the invention. For example, any of printing devices 102A-102N may perform process 300.

In block 302, an initial help screen is displayed. For example, printing device 102A may display an initial help screen through operation panel 110A. The initial help screen may comprise selectable user interface elements with labels such as "print latest manual" and "online help."

In block 304, it is determined whether a user interface element, which represents a request to print a user manual, has been selected. For example, printing device 102A may determine whether a user interface element labeled "print latest manual" has been selected through operation panel 110A. If such a user interface element has not been selected, then control passes back to block 304. If such a user interface element has been selected, then control passes to block 306.

In block 306, user manual data is obtained from a database. User manual data is one kind of help data. For example, printing device 102A may obtain user manual data by downloading user manual data that is stored in help and solution master data 124. For another example, printing device 102A may obtain user manual data that is stored in help and solution data 116.

In block 308, the user manual is printed on sheet media. For example, printing device 102A may print the user manual, based on the user manual data, on one or more sheets of paper through printing module 112A. Prior to printing, the user manual data may be formatted according to a specified format.

Example Process for Providing Updated Solution Data at a Printing Device

Figure 4:
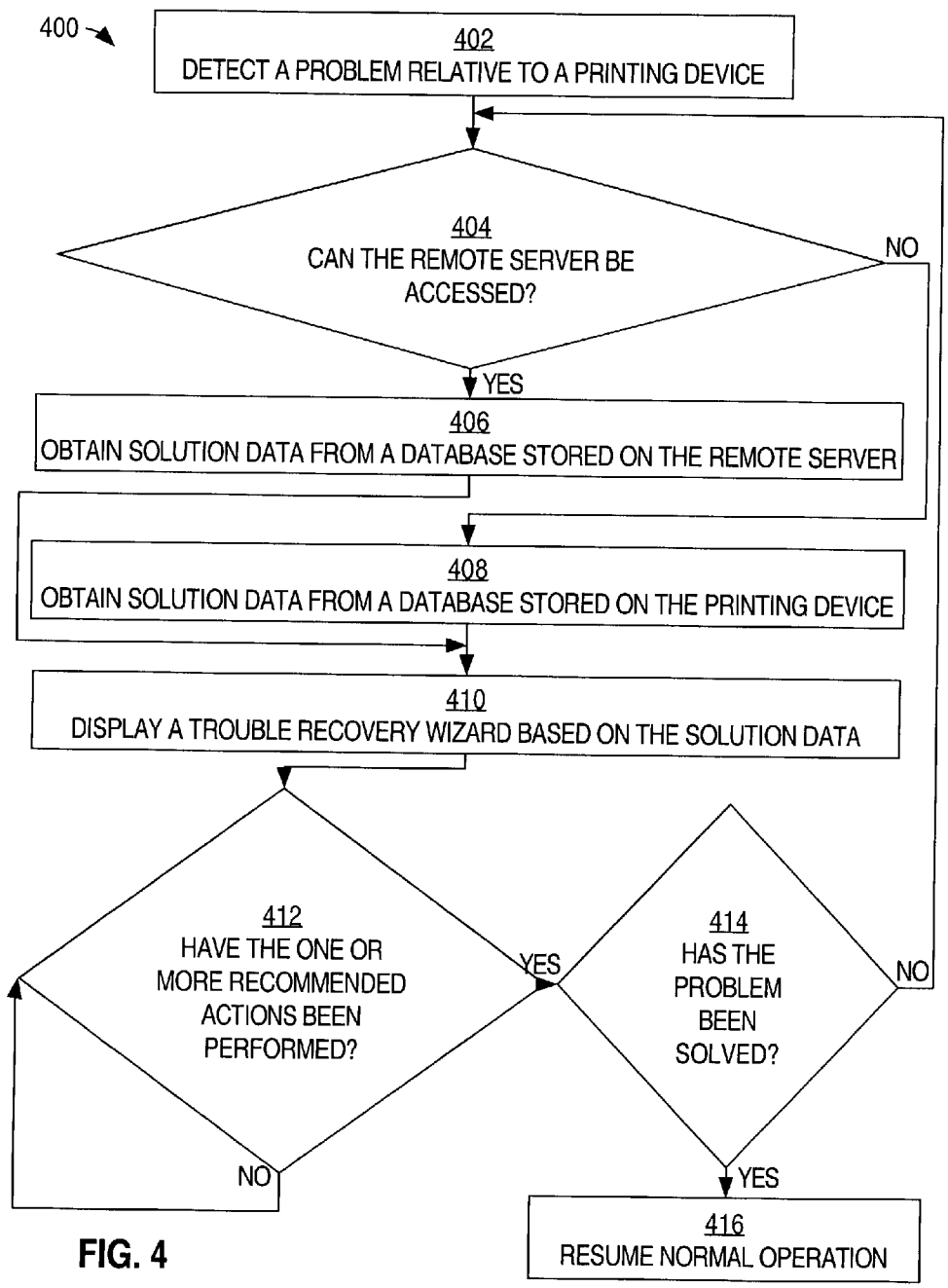
FIG. 4 is a flow diagram that depicts a process for providing updated solution information at a printing device, according to one embodiment of the invention.

FIG. 4 is a flow diagram that depicts a process 400 for providing updated solution information at a printing device, according to one embodiment of the invention. For example, any of printing devices 102A-102N may perform process 400.

In block 402, a problem is detected relative to a printing device. For example, printing device 102A may detect a paper jam in printing module 112A. According to one embodiment of the invention, each problem is associated with a different problem code.

In block 404, it is determined whether a remote server can be accessed. For example, printing device 102A may determine whether it can currently access, through network interface 120A and network 108, help and solution data server 104. If the remote server can be accessed, then control passes to block 406. If the remote server cannot be accessed, then control passes to block 408.

In block 406, solution data is obtained from a database stored on the remote server. For example, printing device 102A may obtain solution data by downloading solution data that is stored in help and solution master data 124. According to one embodiment of the invention, printing device 102A searches a database for solution data that matches a particular problem code.

In block 408, solution data is obtained from a database stored on the printing device. For example, printing device 102A may obtain solution data that is stored in help and solution data 116.

In block 410, based on the solution data, a trouble recovery wizard is displayed. For example, printing device 102A may display one or more recommended actions, which are based on the solution data and comprise a trouble recovery wizard, through operation panel 110A.

In block 412, it is determined whether the one or more recommended actions have been performed. For example, printing device 102A may determine whether its hardware status has changed—such as whether a particular cover of the printing device has been opened as recommended. For another example, printing device 102A may determine whether user input, which indicates that the one or more recommended actions have been performed, has been received through operation panel 110A. If the one or more recommended actions have not been performed, then control passes back to block 412. If the one or more recommended actions have been performed, then control passes to block 414.

In block 414, it is determined whether the problem has been solved. For example, printing device 102A may determine whether the problem is still detected—such as whether paper still jams printing module 112A. For another example, printing device may determine whether user input, which indicates that the problem has been solved, has been received through operation panel 110A. If the problem has not been solved, then control passes back to block 404, after which additional solution data may be obtained from a database in either block 406 or block 408. If the problem has been solved, then control passes to block 416, in which normal operation resumes.

Figure 5:
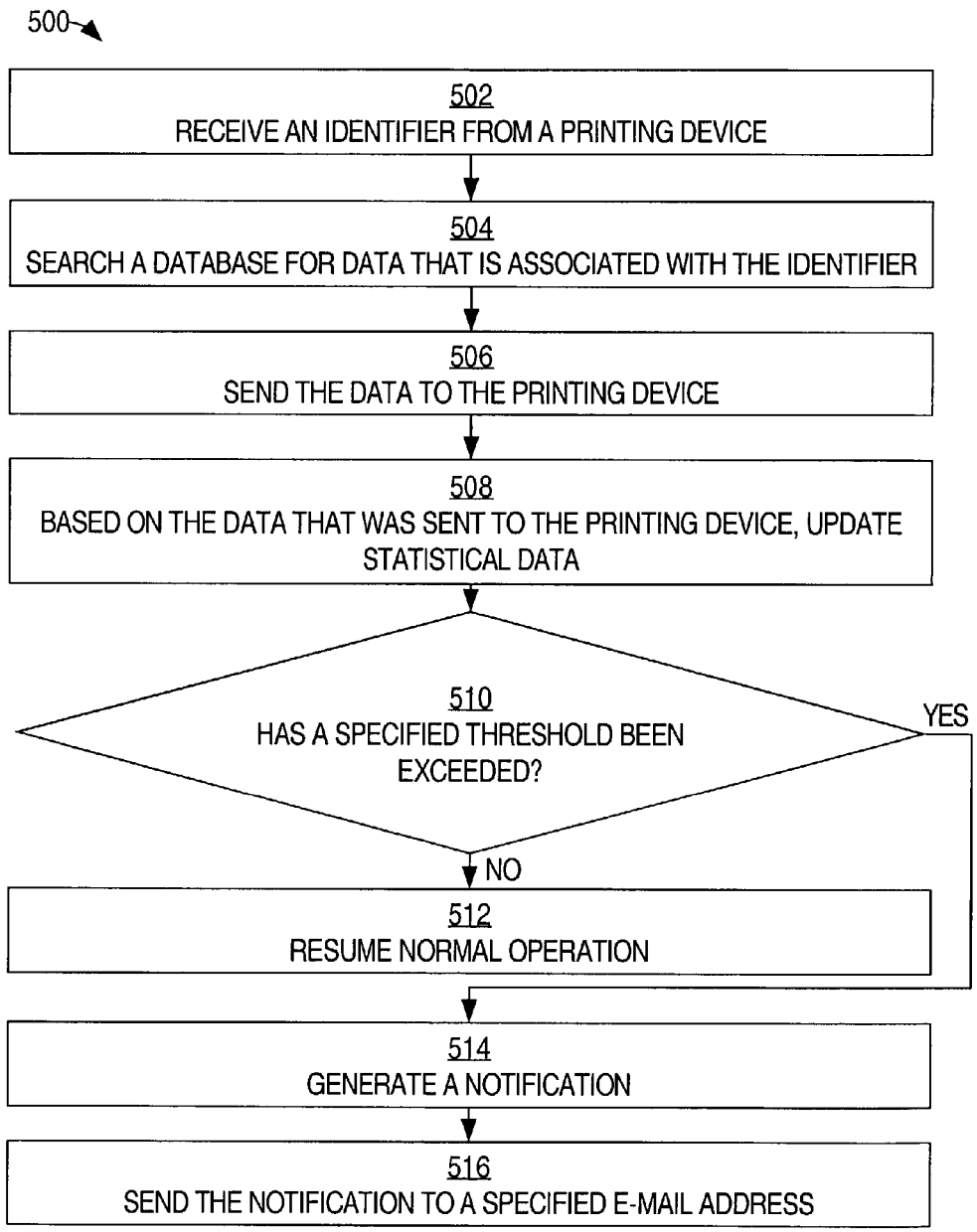
FIG. 5 is a flow diagram that depicts a process for sending a notification based on help and solution data access statistics, according to one embodiment of the invention.

Example Process for Sending a Notification Based on Help and Solution Data Access Statistics FIG. 5 is a flow diagram that depicts a process 500 for sending a notification based on help and solution data access statistics, according to one embodiment of the invention. For example, help and solution database server 104 may perform process 500.

In block 502, an identifier is received from a printing device. For example, help and solution data server 104 may receive a keyword or a problem code from printing device 102A.

In block 504, a database is searched for data that is associated with the identifier. For example, help and solution data server 104 may search help and solution master data 124 for help data that contains or is associated with a particular keyword. For another example, help and solution data server 104 may search help and solution master data 124 for solution data that is associated with a particular problem code.

In block 506, the data that is associated with the identifier is sent to the printing device. For example, help and solution data server 104 may upload, to printing device 102A, help data that is associated with a particular keyword, or solution data that is associated with a particular problem code.

In block 508, statistical data is updated based on the data that was sent to the printing device. For example, help and solution data server 104 may increment, in statistics master data 126, a particular counter that is associated with the data that was sent to the printing device.

In block 510, it is determined whether a specified threshold has been exceeded. For example, help and solution data server 104 may determine from statistical data 126 whether a number of times that the help or solution data has been sent to the printing device exceeds a specified threshold. If the specified threshold has not been exceeded, then control passes to block 512, in which normal operation resumes. If the specified threshold has been exceeded, then control passes to block 514.

In block 514, a notification is generated. For example, help and solution data server 104 may generate a notification that indicates that the data that was sent to the printing device has been sent a number of times that exceeds a specified threshold.

In block 516, the notification is sent to a specified e-mail address. For example, the notification may be sent to an e-mail address that corresponds to an e-mail account from which administrator computer 106 can obtain e-mail messages. Based on the notification, the notification's recipient may choose to update the help or solution data in an effort to reduce the frequency at which users access that help or solution data in the future.

Example Process for Periodically Synchronizing Help and Solution Databases

Figure 6A:
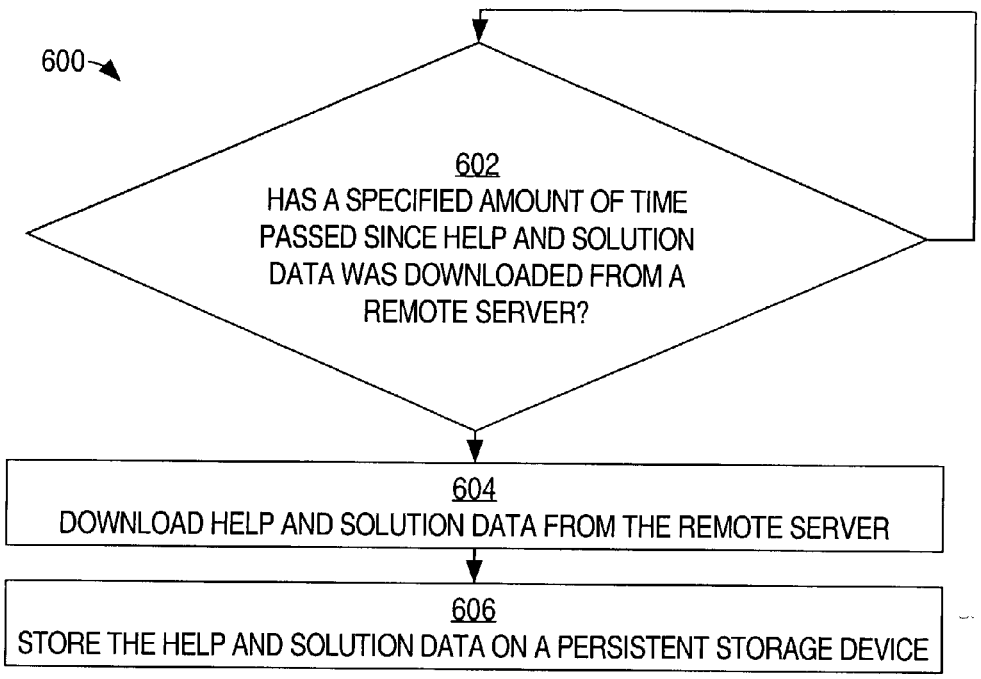
FIGS. 6A and 6B are flow diagrams that depict processes for periodically synchronizing help and solution databases, according to one embodiment of the invention.

FIG. 6A is a flow diagram that depicts a process 600 for periodically synchronizing help and solution databases, according to one embodiment of the invention. For example, any of printing devices 102A-102N may perform process 600.

In block 602, it is determined whether a specified amount of time has passed since help and solution data was downloaded from a remote server. For example, printing device 102A may determine whether a specified amount of time has passed since the printing device downloaded all of the relevant data that is contained in help and solution master data 124. Because help and solution master data 124 may contain data for printing devices of other kinds than printing device 102A, the printing device does not need to download data that is specified as being relevant only to other kinds of printing devices. If the specified amount of time has not yet passed, then control passes back to block 602. If the specified amount of time has passed, then control passes to block 604.

In block 604, help and solution data is downloaded from the remote server. For example, printer 102A may download all of the relevant data that is contained in help and solution master data 124. Such data may include help data, such as user manual information and instructions for operating printing device 102A, and solution data, such as recommended actions for solving particular problems relative to printing device 102A.

In block 606, the help and solution data is stored on a persistent storage device. For example, printer 102A may store the downloaded information in help and solution data 116A on persistent storage device 114A.

Figure 6B:
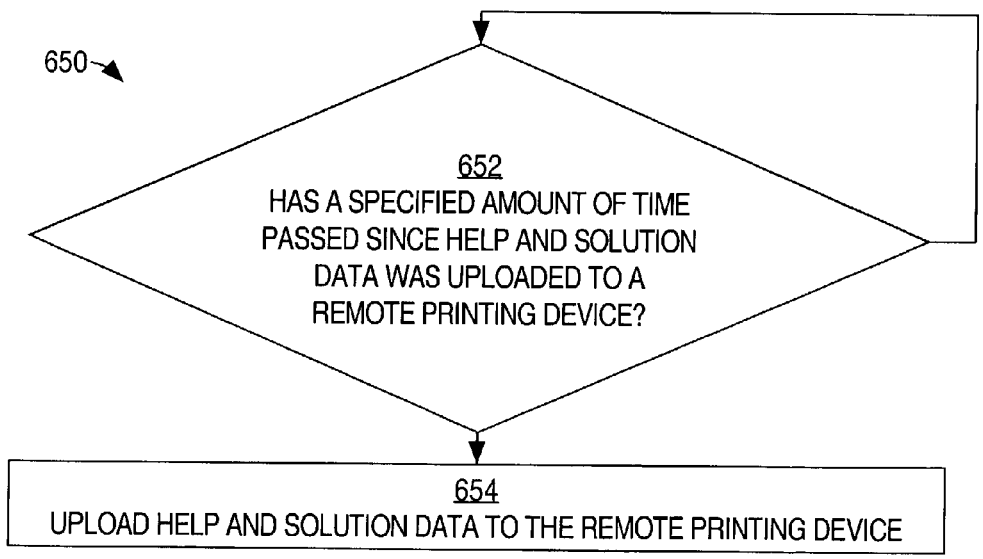

FIG. 6B is a flow diagram that depicts a process 650 for periodically synchronizing help and solution databases, according to one embodiment of the invention. For example, help and solution data server 104 may perform process 650.

In block 652, it is determined whether a specified amount of time has passed since help and solution data was uploaded to a particular remote printing device. For example, help and solution data server 104 may determine whether a specified amount of time has passed since the server uploaded, to printing device 102A, data that is contained in help and solution master data 124. If the specified amount of time has not yet passed, then control passes back to block 652. If the specified amount of time has passed, then control passes to block 654.

In block 654, help and solution data is uploaded to the particular remote printing device. For example, help and solution data server 104 may upload, to printing device 102A, all of the relevant data that is contained in help and solution master data 124.

Example Printing Device Operation Panel

Figure 7A:
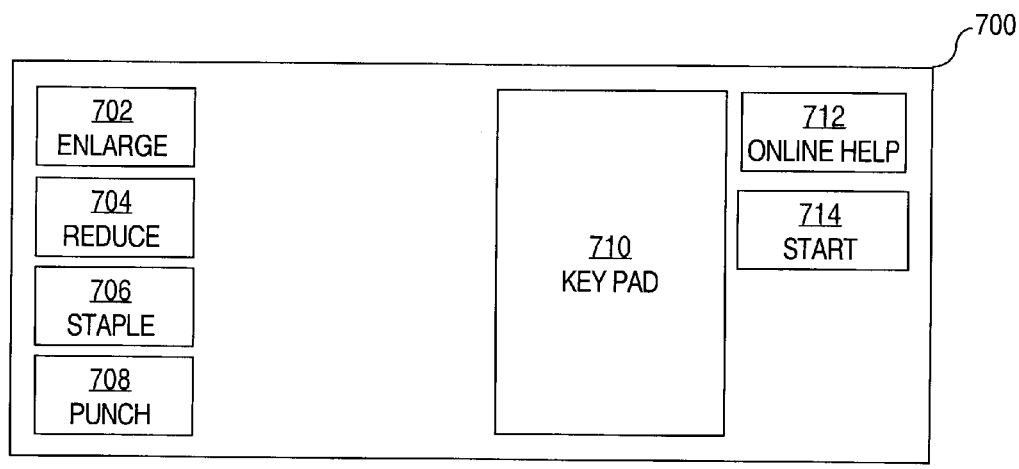
FIGS. 7A-7D are block diagrams that depict an example printing device operation panel, according to one embodiment of the invention.

FIG. 7A is a block diagram that depicts an example printing device operation panel 700, according to one embodiment of the invention. Operating panel 700 includes interface elements 702-708, a keypad 710, an online help button 712, and a start button 714. One or more of the components of operation panel 700 may be implemented using a touch-sensitive LCD. Thus, one or more components of operation panel 700 may be graphically rendered.

Interface elements 702-708 indicate functions that a printing device is configured to provide relative to a print job or copy job. Interface element 702 indicates the availability of an enlarge function. Interface element 704 indicates the availability of a reduce function. Interface element 706 indicates the availability of a staple function. Interface element 708 indicates the availability of a punch function. A user may select one or more of interface elements 702-708 by touching the interface elements that the user wishes to select. Selection of an interface element may cause that interface element to differ in appearance to indicate that the operation panel has detected the selection of that interface element. For example, if interface element 702 has been selected, then interface element 702 may be shown in a darker color.

Keypad 710 may include actual physical keys or a graphical representation of keys. Keypad 710 may include numerical keys for digits "0" through "9." Keypad 710 may also include keys that represent other symbols, such as "*" and "#". A user may use the keys of keypad 710 to input information that is requested by the printing device, such as a number of copies to be made.

Figure 7B:
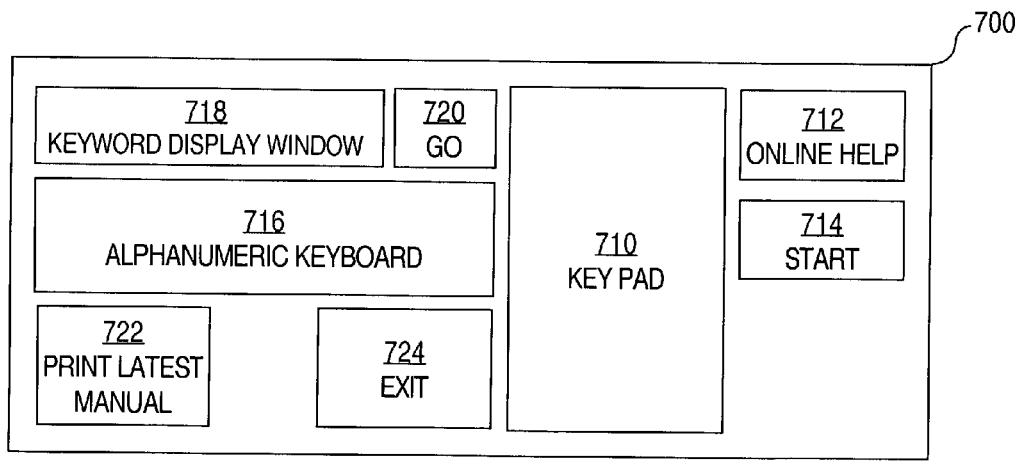

In one embodiment of the invention, if online help button 712 is selected, then operation panel 700 displays an initial online help screen such as that depicted in FIG. 7B. Online help button 712 may be displayed in a darker color when online help button 712 is selected. In one embodiment of the invention, if start button 714 is selected, then a copy job or print job is processed according to whatever functions have been selected.

FIG. 7B is a block diagram that depicts example printing device operation panel 700 displaying an initial online help screen, according to one embodiment of the invention. Instead of interface elements 702-708, interface elements 716-724 are displayed on operation panel 700. Interface element 716 is an alphanumeric keyboard. Interface element 718 is a keyword display window. Interface element 720 is a "go" button. Interface element 722 is a "print latest manual" button. Interface element Interface element 724 is an "exit" button.

According to one embodiment of the invention, when a key on alphanumeric keyboard 716 is selected, the alphanumeric character represented by that key appears in keyword display window 718. Thus, a user may touch characters that are represented on the alphanumeric keyboard 716 to enter one or more keywords into keyword display window 718. When "go" button 720 is selected, then operation panel 700 displays an particular online help screen such as that depicted in FIG. 7C.

According to one embodiment of the invention, when "print latest manual" button 722 is selected, the printing device on which operation panel 700 is located prints an updated copy of a user manual for the printing device. As described above, updated user manual data may be obtained from a remote server. Thus, a user does not need to leave the printing device to obtain a current user manual for the printing device.

According to one embodiment of the invention, when "exit" button 724 is selected, operation panel 700 ceases displaying interface elements 716-724 as depicted in FIG. 7B, and instead displays interface elements 702-708 as depicted in FIG. 7A.

Figure 7C:
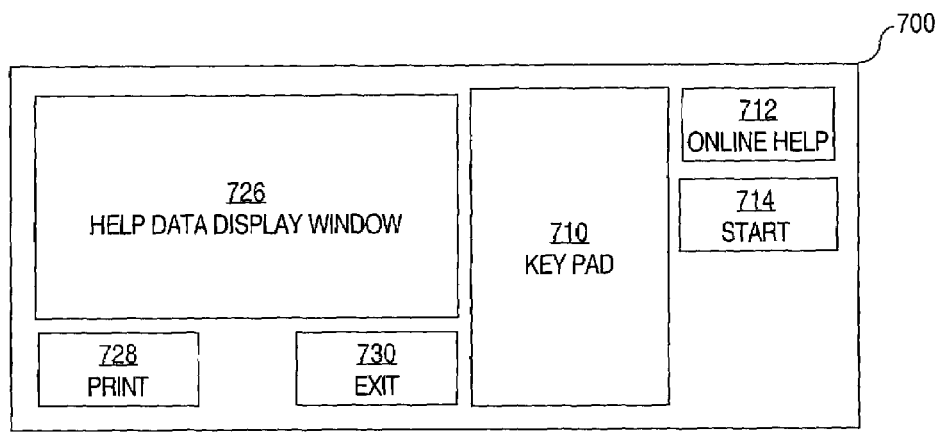

FIG. 7C is a block diagram that depicts example printing device operation panel 700 displaying a particular online help screen, according to one embodiment of the invention. Instead of interface elements 716-724, interface elements 726-730 are displayed on operation panel 700. Interface element 726 is a help data display window. Interface element 728 is a "print" button. Interface element 730 is an "exit" button.

According to one embodiment of the invention, help data display window 726 depicts help data that is associated with the one or more keywords that were displayed in keyword display window 718 at the time that "go" button 720 was selected. For example, if the keywords are "bypass tray," then help display window 726 may display help data such as, "Use when copying onto OHP transparencies, adhesive labels, translucent paper, postcards, and custom size paper." Help display window 726 may additionally display the one or more keywords themselves. As described above, updated help data may be obtained from a remote server. The help data may comprise text and/or images. Help data display window 726 may comprise a scroll bar having interface elements that may be selected to scroll the help data from beginning to end within the help display window if the help data is too large to be completely displayed within the help display window.

According to one embodiment of the invention, when "print" button 728 is selected, the printing device on which operation panel 700 is located prints the help data that is at least partially displayed in help data display window 726. According to one embodiment of the invention, when "exit" button 730 is selected, operation panel 700 ceases displaying interface elements 726-730 as depicted in FIG. 7C, and instead displays interface elements 702-708 as depicted in FIG. 7A.

Figure 7D:
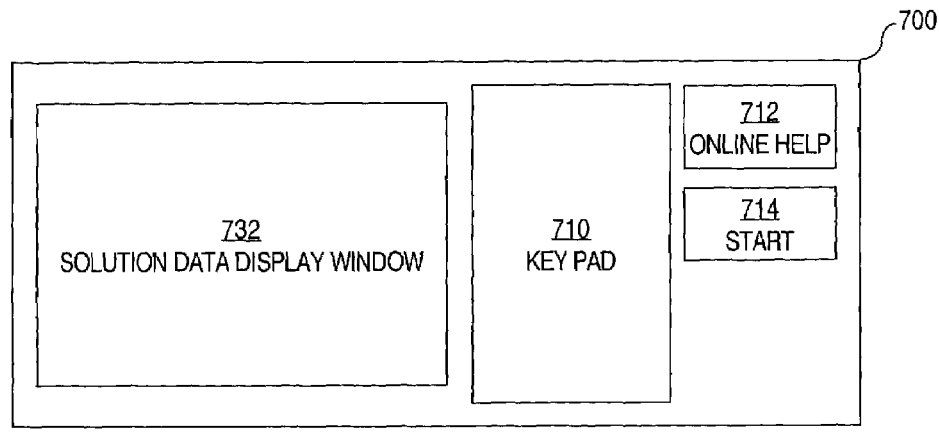

FIG. 7D is a block diagram that depicts example printing device operation panel 700 displaying a trouble recovery wizard screen, according to one embodiment of the invention. Instead of interface elements 702-708, interface element 732 is displayed on operation panel 700. Interface element 732 is a solution data display window.

According to one embodiment of the invention, solution data display window 732 depicts one or more recommended actions for solving a problem that the printing device detected. As described above, updated solution data, upon which the one or more recommended actions are based, may be obtained from a remote server. Solution data display window 732 may depict the one or more recommended actions sequentially rather than simultaneously. Solution display window may depict a next sequential recommended action when the printing device detects that a former sequential recommended action has been performed. The one or more recommended actions may be presented in an order in which the must or should be performed.

For example, if the detected problem is a paper jam, then solution display window 732 may first depict a recommended action such as, "1. Open the front cover." Then, when the printing device detects that the front cover has been opened, solution data display window 732 may next depict a recommended action such as, "2. Hold the green lever and pull out the cartridge gently." Once the problem has been solved, then operation panel 700 ceases displaying interface element 732 as depicted in FIG. 7D, and instead displays interface elements 702-708 as depicted in FIG. 7A.

Implementation Mechanisms

Figure 8:
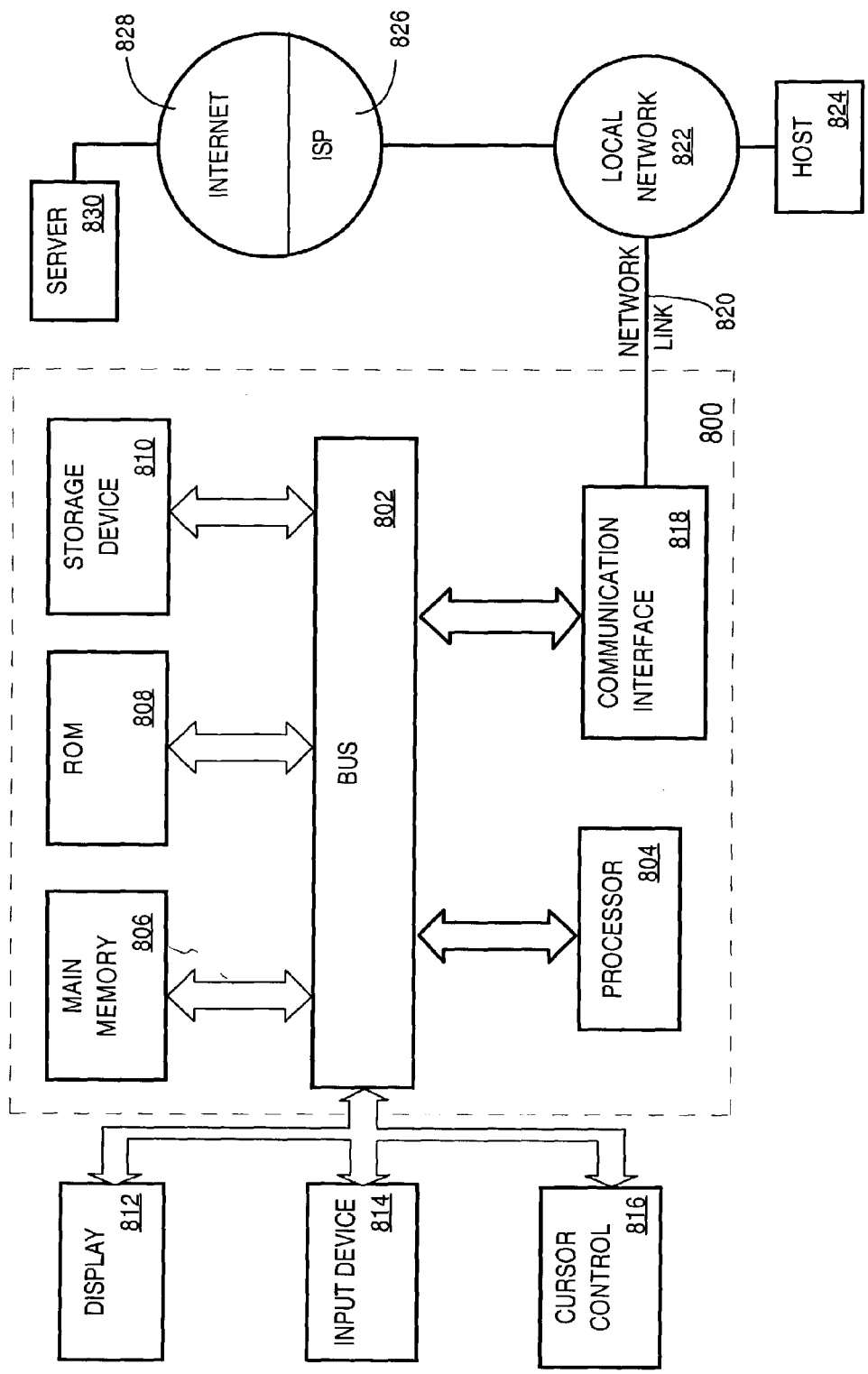
FIG. 8 is a block diagram that depicts a computer system upon which an embodiment of the invention may be implemented

FIG. 8 is a block diagram that depicts a computer system upon which an embodiment of the invention may be implemented. For example, help and solution data server 104 may be implemented on computer system 800. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions. Management server 104 may be implemented on computer system 800.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for confirming the wireless transmission of image or sound data from a mobile device. According to one embodiment of the invention, computer system 800 provides for confirming the wireless transmission of image or sound data from a mobile device in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments of the invention, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a LAN card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the Internet 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for configuring a monitoring system to monitor selected network elements as described herein. Processor 804 may execute the received code as it is received and/or stored in storage device 810 or other non-volatile storage for later execution. In this manner, computer system 800 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A printing device configured to:
   detect a problem relative to the printing device;
   download, in response to detecting the problem relative to the printing device, solution data from a specified remote server that stores the solution data;
   display, through a user interface on the printing device, one or more recommended actions, based on the solution data, to address the problem;
   update statistics that indicate how many times the one or more recommended actions have been displayed;
   determine whether a number of times that the one or more recommended actions have been displayed exceeds a specified threshold;
   generate, in response to determining that the number of times that the one or more recommended actions have been displayed exceeds the specified threshold, a notification that indicates that the number of times that the one or more recommended actions have been displayed exceeds the specified threshold; and
   send the notification to a specified e-mail address.

2. The printing device of claim 1, wherein the printing device is further configured to:
   determine, in response to detecting the problem, whether the printing device can currently access, through a communication interface of the printing device, the specified remote server that stores the solution data; and
   display, in response to determining that the printing device cannot currently access the specified remote server that stores the solution data, one or more recommended actions that are based on solution data that the printing device previously downloaded from the remote server.

3. The printing device of claim 1, wherein the printing device is further configured to:
   select, based on the problem, the one or more recommended actions from among a plurality of possible recommended actions.

4. The printing device of claim 1, wherein the printing device is further configured to:
   periodically download, at one or more specified intervals of time, other solution data from the specified remote server that stores the solution data.

5. The printing device of claim 1, wherein the printing device is further configured to:
   store the solution data on a persistent storage device.

6. A printing device configured to:
   receive user input through a user interface on the printing device;
   print, in response to receiving the user input through the user interface on the printing device, and through a printing mechanism in the printing device, one or more instructions for operating the printing device;
   determine whether the printing device can currently access a specified remote server that stores the one or more instructions for operating the printing device; and
   download, from the specified remote server that stores the one or more instructions for operating the printing device, and in response to determining that the printing device can currently access the specified remote server that stores the one or more instructions for operating the printing device, one or more of the one or more instructions for operating the printing device.

7. The printing device of claim 6, wherein the printing device is further configured to:
   periodically download, from the specified remote server that stores the one or more instructions for operating the printing device, and at one or more specified intervals of time, one or more other instructions for operating the printing device.

8. The printing device of claim 6, wherein the printing device is further configured to:
store the one or more instructions on a persistent storage device.

9. The printing device of claim 6, wherein the one or more instructions for operating the printing device comprise at least a portion of a user manual.

10. A printing device configured to:
receive user input through a user interface on the printing device;
print, in response to receiving the user input through the user interface on the printing device, and through a printing mechanism in the printing device, one or more instructions for operating the printing device;
determine whether the printing device can currently access a specified remote server that stores the one or more instructions for operating the printing device; and
print, in response to receiving the user input through the user interface on the printing device, and in response to determining that the printing device cannot currently access the specified remote server that stores the one or more instructions for operating the printing device, one or more instructions that the printing device previously downloaded from the remote server.

11. A printing device configured to:
receive user input through a user interface on the printing device;
select, based on the user input, from among a plurality of help instructions that specify how to operate the printing device, one or more particular help instructions that both correspond to the user input and specify how to operate the printing the device;
display, through the user interface on the printing device, the one or more particular help instructions;
update statistics that indicate how many times the one or more particular help instructions have been selected;
determine whether a number of times that the one or more particular help instructions have been selected exceeds a specified threshold; and
generate, in response to determining that the number of times that the one or more particular help instructions have been selected exceeds the specified threshold, a notification that indicates that the number of times that the one or more particular instructions have been selected exceeds the specified threshold.

12. The printing device of claim 11, wherein the printing device is further configured to:
send the notification to a specified e-mail address.

13. A method of updating printing device solution data, the method comprising:
uploading, to a remote printing device, solution data that includes one or more recommended actions to address one or more problems that could affect the remote printing device;
updating statistics that indicate how many times one or more particular help instructions have been selected;
determining whether a number of times that the one or more particular help instructions have been selected exceeds a specified threshold;
generating, in response to determining that the number of times that the one or more particular help instructions have been selected exceeds the specified threshold, a notification that indicates that the number of times that the one or more particular instructions have been selected exceeds the specified threshold; and
sending the notification to a specified e-mail address.

14. The method of claim 13, wherein uploading further comprises:
uploading, in response to the remote printing device detecting a particular problem relative to the remote printing device, solution data that includes one or more recommended actions to address the particular problem.

15. The method of claim 13, wherein uploading further comprises:
periodically uploading, to the remote printing device, at one or more specified intervals of time, other solution data.

16. The method of claim 13, further comprising:
uploading, to the remote printing device, and in response to the remote printing device receiving user input through a user interface on the remote printing device, one or more instructions that are contained in a user manual.

17. The method of claim 13, further comprising:
periodically uploading, to the remote printing device, at one or more specified intervals of time, one or more instructions that are contained in a user manual.

18. A method of updating printing device solution data, the method comprising:
uploading, to a remote printing device, solution data that includes one or more recommended actions to address one or more problems that could affect the remote printing device;
updating statistics that indicate how many times one or more particular recommended actions have been displayed on one or more printing devices;
determining whether a number of times that the one or more particular recommended actions have been displayed on the one or more printing devices exceeds a specified threshold;
generating, in response to determining that the number of times that the one or more particular recommended actions have been displayed on the one or more printing devices exceeds the specified threshold, a notification that indicates that the number of times that the one or more recommended actions have been displayed on the one or more printing devices exceeds the specified threshold; and
sending the notification to a specified e-mail address.

19. A computer-readable storage medium encoded with one or more sequences of instructions for updating printing device solution data, which instructions, when executed by one or more processors, cause the one or more processors to perform steps comprising:
uploading, to a remote printing device, solution data that includes one or more recommended actions to address one or more problems that could affect the remote printing device;
updating statistics that indicate how many times one or more particular help instructions have been selected by one or more printing devices;
determining whether a number of times that the one or more particular help instructions have been selected by the one or more printing devices exceeds a specified threshold;
generating, in response to determining that the number of times that the one or more particular help instructions have been selected by the one or more printing devices exceeds the specified threshold, a notification that indicates that the number of times that the one or more particular instructions have been selected by the one or more printing devices exceeds the specified threshold; and sending the notification to a specified e-mail address.

20. The computer-readable storage medium of claim 19, wherein uploading further comprises:

uploading, in response to the remote printing device detecting a particular problem relative to the remote printing device, solution data that includes one or more recommended actions to address the particular problem.

21. The computer-readable storage medium of claim 19, wherein uploading further comprises:

periodically uploading, to the remote printing device, at one or more specified intervals of time, the solution data.

22. The computer-readable storage medium of claim 19, wherein the instructions, when executed by the one or more processors, further cause the one or more processors to perform the step of:

uploading, to the remote printing device, and in response to the remote printing device receiving user input through a user interface on the remote printing device, one or more instructions that are contained in a user manual.

23. The computer-readable storage medium of claim 19, wherein the instructions, when executed by the one or more processors, further cause the one or more processors to perform the step of:

periodically uploading, to the remote printing device, at one or more specified intervals of time, one or more instructions that are contained in a user manual.

24. A computer-readable storage medium encoded with one or more sequences of instructions for updating printing device solution data, which instructions, when executed by one or more processors, cause the one or more processors to perform steps comprising:

uploading, to a remote printing device, solution data that includes one or more recommended actions to address one or more problems that could affect the remote printing device;

updating statistics that indicate how many times one or more particular recommended actions have been displayed on one or more printing devices;

determining whether a number of times that the one or more particular recommended actions have been displayed on the one or more printing devices exceeds a specified threshold;

generating, in response to determining that the number of times that the one or more particular recommended actions have been displayed on the one or more printing devices exceeds the specified threshold, a notification that indicates that the number of times that the one or more recommended actions have been displayed on the one or more printing devices exceeds the specified threshold; and sending the notification to a specified e-mail address.

* * * * *